UNITED STATES PATENT OFFICE.

JOSEPH M. A. DEHERRYPON, OF PARIS, FRANCE.

MANUFACTURE OF GLASSWARE.

SPECIFICATION forming part of Letters Patent No. 223,637, dated January 20, 1880.

Application filed October 11, 1879.

*To all whom it may concern:*

Be it known that I, JOSEPH MARTIAL AUGUSTIN DEHERRYPON, of Paris, France, have invented Improvements in the Manufacture of Glassware; and I do hereby declare that the following is a full, clear, and exact description of the same.

The coefficient of elasticity of glass is extremely variable, according as its molecular condition has been more or less affected by tempering, which, as in the case of steel, is effected not only by dipping the glass article in a liquid more or less heated, but also by cooling it more or less suddenly in a fluid, such as air.

The Indians and Kabyles temper the blades of their yataghans, after heating them, by whirling them rapidly in the air, instead of plunging them in water. "Rupert's drops" may also be produced by whirling a drop of glass in the air.

A Rupert's drop may be taken as an extreme example of tempering highly-heated glass in a relatively very cold liquid. It is well known that in falling into cold water the surface or skin of the glass drop becomes suddenly contracted. It acquires great hardness, and at the same time excessive fragility. By merely breaking off the tail end the entire drop explodes and becomes reduced to powder. The same phenomenon is observed in articles of glass which are cooled spontaneously in the air. When a spoiled bottle is thrown on one side by the workman before completion, it becomes tempered by exposure to the circumambient air and acquires the characteristic properties of the Rupert's drops, for if a small fragment of glass or other substance equally light be dropped into it, it will be sufficient to break it, and even cause it to explode. In either case the result of the tempering, in increasing the hardness of the glass, has been to considerably affect its molecular arrangement.

M. de Luynes, who has succeeded in analyzing the peculiar phenomenon of the Rupert's drop, has demonstrated by microscopical examination that the structure of the glass drop resembled a succession of independent blades or laminæ doubled upon themselves like a series of spring-plates, the point of attachment being at the tail end of the drop, and that by breaking this end the ephemeral equilibrium of the molecules is destroyed and the glass becomes reduced to powder. This excessive fragility is not, however, irremediable, since, if a Rupert's drop be reheated and afterward gradually cooled—*i. e.*, annealed—it loses all its explosive properties, and is not more liable to break than ordinary well-manufactured glass. It is then annealed glass—*i. e.*, lowered in temper—its coefficient of elasticity, which was *nil*, ranking with that of glass annealed in the ordinary way.

All glass articles, whether blown or molded, are necessarily air-tempered during the time that (when in the hands of the workman, before being conveyed to the annealing-arch) they lose their plastic consistency and become hardened in the cold air. It is at this time that the molecular arrangement takes place, under more or less unstable conditions, according to the intensity and duration of this air-tempering.

Owing to the constant opening and closing of the annealing-arch and its unequal heating, glass does not become properly annealed, but the injurious effects of the air-tempering are merely arrested more or less completely, and to this necessarily irregular action is attributable the variation in the toughness and elasticity of glass.

The tempering of glass articles in very hot liquids, as practiced by M. de la Bastie, evidently increases their hardness and resistance to blows, but it also deprives them of a portion of their elasticity and molecular cohesion. When such an article is accidentally broken or its "skin" injured, it flies into a thousand fragments, like the Rupert's drop, and from the same causes, it being in fact only a variety of Rupert's drop, and differing only from it in the infinitely less difference between the temperature of the article and that of the liquid in which it is tempered. It also differs from it in the qualities which it acquires by a gradual and progressive cooling in the liquid in which it is plunged. If, then, the tempering of glass increases its hardness, it also considerably diminishes its elasticity, and this quality can only be restored to it, as we have seen in the case of the Rupert's drop, by reheating the glass to a temperature approaching that at which it softens—that is to say, to the point where it spontaneously becomes air-tempered, for example—and then allowing it to cool very gradually in a suitable heated medium.

Elasticity is a quality essential to the uses of glass. Thus it is its elasticity and not its hardness which enables champagne and aerated-water bottles to withstand the prolonged pressures to which they are necessarily subjected, and also enables them to withstand repeated and sudden changes of temperature.

A champagne-bottle, if made of an insufficiently elastic glass, can only be once used, as its entire strength of resistance will be exhausted, and cannot sustain a second time the prolonged pressure of the gases of fermentation. This has been proved by the fact of a bottle tested to twenty atmospheres, and, having resisted this enormous pressure, ultimately breaking under a pressure of five to six atmospheres only. To give another example, a pane of glass supporting a momentary pressure of, say, twenty-five kilograms will, after the lapse of some hours, break beneath the continued but less pressure of seventeen kilograms. These facts and many others relating to the resistance of glass to sudden changes of temperature prove that in the majority of cases elasticity is more necessary to glass than hardness. The latter quality is obtained by tempering, while elasticity is obtained, as above mentioned, by gradually reheating the glass to a temperature (dull red) at which it was more or less injuriously air-tempered, and then allowing it to gradually cool in a suitable medium.

The object of my invention is to provide a process by which the pressed or blown glass articles can be thoroughly reheated to a point just short of softening, and then gradually cooled without exposure to the air.

My invention consists in reheating the glass articles by direct exposure to highly-heated gases under pressure, and then gradually cooling the said glass articles by the escape of the heated gases with a decreasing pressure of said gases and the radiation of the heat, whereby the glass is thoroughly annealed and great elasticity is given to it.

I will now proceed to describe an apparatus in which my improved process can be carried on; but I do not wish to confine myself to the special form of apparatus here described, as others may be adopted for the purpose.

The apparatus for annealing glass is composed of a circular or rectangular oven in which crystal or other glass objects of all kinds are piled so as to economize space as much as possible, without, however, running the risk of rendering them misshapen by too great a weight when their temperature approaches that at which they soften. For this purpose the oven is furnished with a kind of seggars or stands of fire-clay.

The oven is heated by one, or preferably by two, furnaces, placed symmetrically opposite one another, their capacity varying with that of the oven and the temperature to be attained.

The furnaces are fed with coke or other smokeless fuel through a hopper capable of being hermetically closed, (as is also the ash-pit,) the blast necessary for combustion being introduced beneath the grate at a pressure which may be as high as fifteen centimeters of mercury on the gage.

A chamber similar to those of the Siemens' regenerative furnaces separates the oven from each of the furnaces. These chambers are filled with bricks, built up in quincunx order, with zigzag interstices between them, so as to prolong the traverse of the furnace-gases in order to accumulate and regulate the heat before their introduction into the oven. After filtering through these passages and accumulating the heat the gases are introduced into the oven, the heat being increased when it is desired to heat it gradually, or decreased for cooling it. The chambers in this case, instead of being regenerators, are heat accumulators and regulators.

The oven, chambers, and furnaces are hermetically inclosed in a sheet or cast iron casing. At the lower part of the oven, on its lateral faces, openings are made provided with conical plugs (or cocks) for the escape of the gases, while maintaining a sufficient pressure and avoiding any return draft or their too rapid escape. The oven is also provided with a man-hole for charging and discharging it.

Suppose the oven to be filled and the fires lighted. At starting, the blast is turned on beneath the grate-bars at a very low pressure, and in only the necessary quantity to light the coke and gradually heat the furnace. The heat of the furnace is next imparted to the bricks of the accumulator, which gradually becomes more and more heated by the contact of the gases, which at first only reach the oven in a cool condition, but become hotter as the accumulator becomes more highly heated. In about an hour's time the pressure of the blast is slightly increased, and is thenceforth gradually raised, according to the indications afforded of the temperature of the gases at the outlet-orifices. The bricks in the accumulator becoming still more heated, the last rows—viz., those next the oven—acquire a low red temperature, and the gases in contact with the same show at their escape a temperature of about 400° centigrade. The pressure in the oven is from five to six centimeters, which is sufficient to envelop the interior and exterior of such articles as small-necked bottles in the same manner as if immersed in a liquid.

The volume and pressure of air introduced beneath the grate are still gradually increased, and the temperature of the gases in the oven soon reaches 525°—that is to say, a dull-red heat. This temperature is maintained for an instant, and the furnaces then stoked once more, for the last time, after having sensibly reduced the pressure. It is, however, always necessary that this pressure be sufficient to maintain a perfect and constant plenum in the oven, this result being readily obtainable by reducing at will the size of the escape-orifices. The oven resembles, in short, the pressure-regulator in the blowing-engines of blast-furnaces.

Under the action of the diminished blast the remainder of the fuel becomes consumed, and very soon after the blast only becomes heated from the sides of the furnace itself, and takes up the necessary complement of heat by filtering through the net-work of bricks in the accumulator, which themselves become proportionately, but slowly, cooled. The cooling of the oven and the glass it contains is also slow and progressive, and it is without any sudden changes and by insensible transitions of temperature that the articles contained in the oven, after having acquired at first a dull-red heat, gradually fall to that of the air we breathe. They are then annealed.

The method hereinbefore described will be readily distinguished from all those which, under the denomination of "annealing," have hitherto been proposed or practiced.

I claim—

The process hereinbefore described of annealing glass, consisting in gradually reheating the glass articles by direct exposure to highly-heated gases which are under pressure, and then gradually cooling the same together with and within the furnace, in the manner substantially as described.

JOSEPH MARTIAL AUGUSTIN DEHERRYPON.

Witnesses:
ROBT. M. HOOPER,
EUGENE HÉBERT.